(12) United States Patent
König

(10) Patent No.: US 9,419,796 B2
(45) Date of Patent: Aug. 16, 2016

(54) METHOD FOR STORING AND RECOVERING DATA, UTILIZATION OF THE METHOD IN A STORAGE CLOUD, STORAGE SERVER AND COMPUTER PROGRAM PRODUCT

(75) Inventor: Christoph König, Ottobrunn (DE)

(73) Assignee: Fujitsu Limited (JP)

( * ) Notice: Subject to any disclaimer, the term of this patent is extended or adjusted under 35 U.S.C. 154(b) by 962 days.

(21) Appl. No.: 13/366,676

(22) Filed: Feb. 6, 2012

(65) Prior Publication Data
US 2012/0203990 A1  Aug. 9, 2012

(30) Foreign Application Priority Data

Feb. 8, 2011  (DE) .......................... 10 2011 010 613

(51) Int. Cl.
*G06F 12/00*  (2006.01)
*H04L 9/08*  (2006.01)
*G06F 11/20*  (2006.01)
*G06F 12/14*  (2006.01)

(52) U.S. Cl.
CPC .......... *H04L 9/0894* (2013.01); *G06F 11/2053* (2013.01); *G06F 12/14* (2013.01)

(58) Field of Classification Search
CPC .... H04L 9/0894; G06F 11/2053; G06F 12/14
USPC .......................................................... 711/164
See application file for complete search history.

(56) References Cited

U.S. PATENT DOCUMENTS

| | | | |
|---|---|---|---|
| 2001/0023483 A1* | 9/2001 | Kiyomoto | G06F 21/606 713/186 |
| 2009/0327751 A1 | 12/2009 | Koifman et al. | |
| 2010/0161926 A1 | 6/2010 | Li et al. | |
| 2011/0029711 A1 | 2/2011 | Dhuse et al. | |

FOREIGN PATENT DOCUMENTS

| | | |
|---|---|---|
| EP | 0 676 876 | 10/1995 |
| WO | 2011/007141 A1 | 1/2011 |

* cited by examiner

*Primary Examiner* — Matthew Bradley
(74) *Attorney, Agent, or Firm* — DLA Piper LLP (US)

(57) ABSTRACT

A method for storing data in which the data to be stored is divided into a plurality of source blocks, each source block subjected to steps including defining a block key for the source block based on a random function, encrypting the source block by utilizing the defined block key, selecting at least one first storage location and one second storage location from a plurality of different available storage locations, storing control data that includes information on the defined block key at the first selected storage location, and storing encrypted data that includes information on the encrypted source block at the second selected storage location.

14 Claims, 6 Drawing Sheets

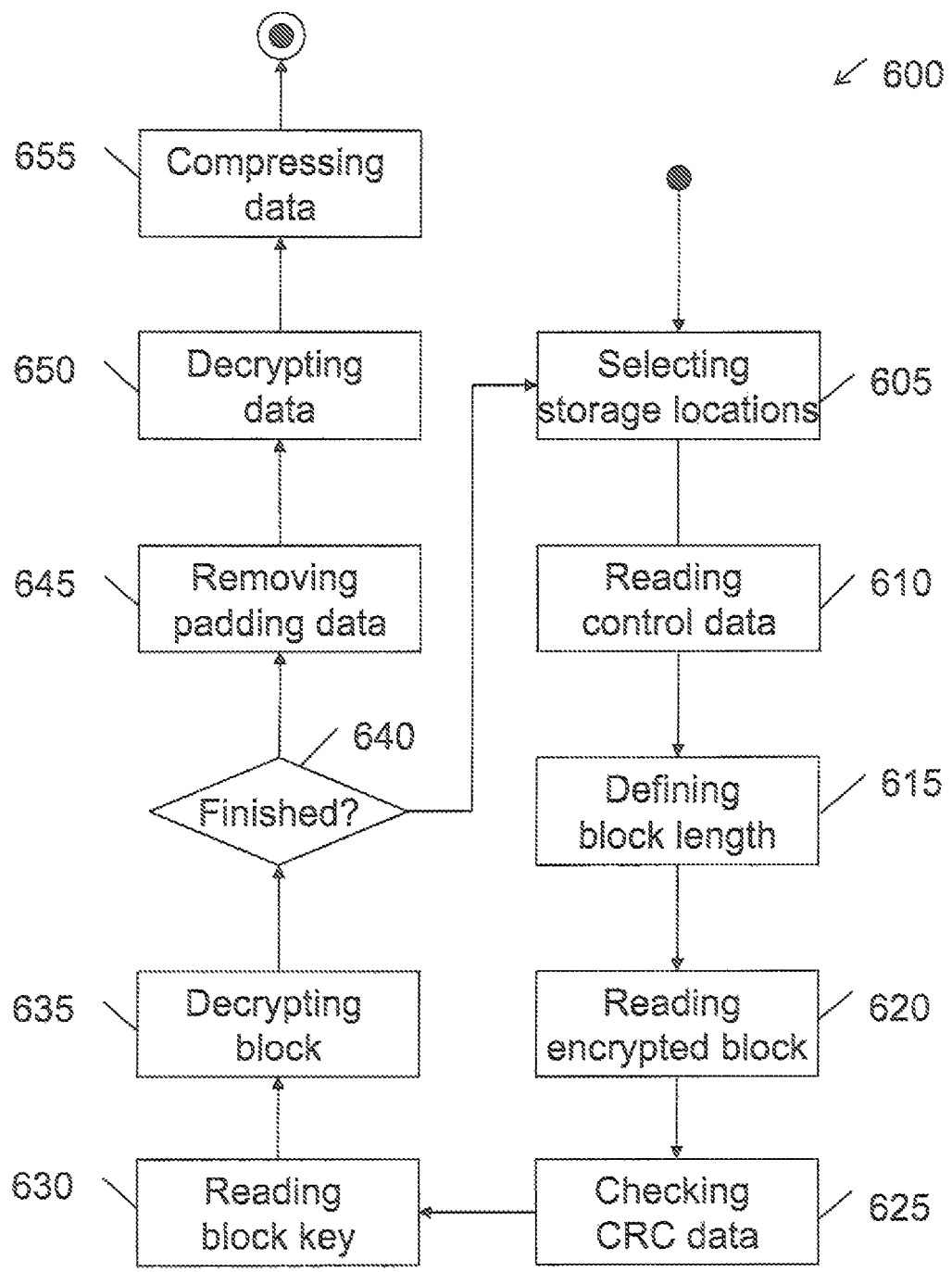

METHOD FOR STORING AND RECOVERING DATA, UTILIZATION OF THE METHOD IN A STORAGE CLOUD, STORAGE SERVER AND COMPUTER PROGRAM PRODUCT

RELATED APPLICATION

This application claims priority of German Patent Application No. 10 2011 010 613.8, filed Feb. 8, 2011, herein incorporated by reference.

TECHNICAL FIELD

This disclosure pertains to a method for storing data in which the data to be stored is divided into a plurality of source blocks. The disclosure also pertains to a method for reading data comprising a plurality of data blocks, as well as to the utilization of the aforementioned methods in a storage cloud comprising a plurality of different storage locations. The disclosure furthermore pertains to a storage server for processing large amounts of data, as well as to a computer program product that is designed for carrying out the aforementioned methods.

BACKGROUND

The progressive networking of IT resources such as, for example, servers that provide computing capacity or storage capacity makes it possible to assemble loose computer networks that jointly solve certain problems. Solutions of this type make it possible, in particular, to distribute parts of or even the entire IT infrastructure of a company throughout the world, wherein it is transparent to the respective user whether a resource used is provided locally or remotely. This process is occasionally also referred to as virtualization of the IT infrastructure.

Basic approaches in which an abstracted IT infrastructure is dynamically adapted to a demand and made available via a network have become generally known under the term "cloud computing." A special application of cloud computing is so-called "cloud storage" in which special storage capacities of different storage resources are provided by different storage locations.

Utilization of the storage space of a storage cloud has significant economical and organizational advantages in comparison with the provision of a local storage capacity. Until now, however, the capabilities of cloud storage have only been utilized sporadically, in particular, because security concerns conflict with the storage of data on unknown servers. Known data security methods, particularly encryption of the stored data, are only conditionally suitable for scenarios in which large amounts of data are stored on an unknown server. If a sufficiently large amount of data and adequate computing power or computing time are available, most practically relevant encryption methods can be cracked, i.e., decrypted without knowledge of the key used for the encryption.

It could therefore be helpful to provide methods for storing and reading data that are particularly suitable for use in a storage cloud and increase data security in comparison with known methods. It could also be helpful to provide devices suitable for carrying out these methods.

SUMMARY

I provide a method for storing data in which the data to be stored is divided into a plurality of source blocks, each source block subjected to steps including defining a block key for the source block based on a random function, encrypting the source block by utilizing the defined block key, selecting at least one first storage location and one second storage location from a plurality of different available storage locations, storing control data that includes information on the defined block key at the first selected storage location, and storing encrypted data that includes information on the encrypted source block at the second selected storage location.

I also provide a method for recovering data that includes a plurality of source blocks, each source block subjected to steps including selecting at least one first storage location and one second storage location from a plurality of different storage locations, at which data to be read is stored, reading control data that includes information on a block key at the first selected storage location, reading encrypted data that includes information on an encrypted data block at the second selected storage location, and decrypting the encrypted data block to recover the source block by utilizing the read block key.

I further provide a storage server for processing large amounts of data, including at least one client interface for storing and recovering data by at least one application, at least one network interface for accessing a plurality of different available storage locations, and at least one processor for executing stored program code, wherein the method is carried out when the stored program code is executed.

I still further provide a computer program product including executable program code, wherein the method is carried out when the program code is executed by a data processing device.

BRIEF DESCRIPTION OF THE DRAWINGS

FIG. 6 shows a flow chart of a method for reading data according to the second example.

LIST OF REFERENCE SYMBOLS

Figure 1:
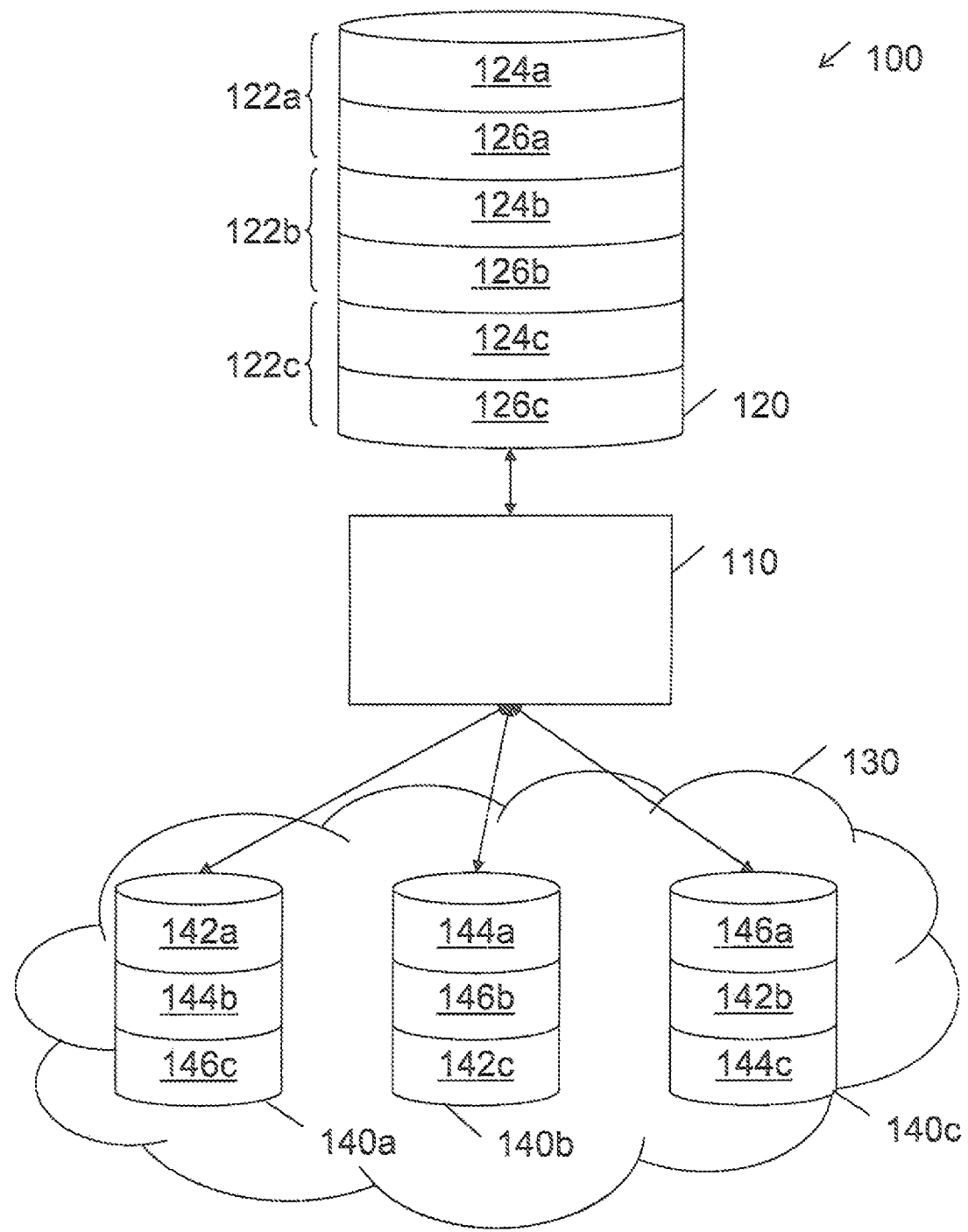
FIG. 1 shows a first arrangement for processing data.

100 First arrangement
110 Storage server
120 Local mass storage
122 Source block
124 (Encrypted) first part
126 (Encrypted) second part
130 Storage cloud
140 Storage location
142 Control block
144 First encrypted data block
146 Second encrypted data block
200 First method for storing data
300 First method for reading data
400 Second arrangement
410 Storage server
420 Data stream
422 Source block
430 Storage cloud
440 Storage location
442 Control block
444 Encrypted data block 500 Second method for storing data
600 Second method for reading data

DETAILED DESCRIPTION

I provide a method for storing data in which the data to be stored may be divided into a plurality of source blocks and the following steps are carried out for each source block:
  defining a block key for the source block based on a random function;
  encrypting the source block by utilizing the defined block key;
  selecting at least one first storage location and one second storage location from a plurality of different available storage locations;
  storing control data that comprises information on the defined block key at the first selected storage location; and
  storing encrypted data that comprises information on the encrypted source block at the second selected storage location.

The method takes advantage of the fact that the data to be stored is divided into a plurality of source blocks that are separately encrypted by utilizing different, individual keys for each block and stored at different storage locations. In this case, the block key required for recovering the encrypted data is respectively stored at a different storage location than the encrypted data. The division of the data and the independent encryption of the individual source blocks, as well as the storage of the encrypted data at different storage locations, practically make it impossible for potential attackers and operators of the individual storage locations to recover the encrypted data based on a statistical analysis of the stored data. In this case, the decryption of information on the encrypted source block becomes the more difficult, the smaller the individual source blocks are chosen.

The at least one first storage location may be selected from the plurality of storage locations by a random function and the at least one second storage location is selected from the remaining storage locations, i.e., the number of storage locations minus the selected storage location, in the selection step. Due to the random selection of the storage locations, it is possible to largely prevent a purposeful collaboration between operators of different storage locations for the purpose of decrypting the stored data.

Redundancy of the data of the source block may be reduced prior to the storage of the encrypted data. A statistical analysis of the encrypted data can be additionally complicated due to the further reduction of the redundancy of the source block prior to the storage of the encrypted data.

The method may additionally comprise the steps of dividing the data of the source block into a number N, N>1 of data blocks and storing the N data blocks at N storage locations of the plurality of storage locations, wherein the data of each of the N data blocks is stored at a different storage location of the selected N storage locations. Due to the N-fold division and storage of data at different storage locations, recovery of the data on the basis of a statistical analysis is exponentially complicated.

The method may comprise the additional step of defining an allocation rule for dividing predefined information units of the source block, wherein the data of the source block is divided over the N data blocks in accordance with the allocation rule during the division step, and wherein the stored control data comprises additional information on the defined allocation rule. The division of information units of the source block and the storage of corresponding data blocks at different storage locations additionally complicate recovery of the data without knowledge of the allocation rule and access to all involved storage locations.

The predefined information units may comprise bytes with 8 bits per byte and the data of the source block is divided over the N data blocks in accordance with the allocation rule such that neither of the N data blocks contains all bits of a byte of the source block. Due to the division of the bits of a byte over different data blocks in accordance with an allocation rule, it is possible to reduce the exploitation of statistical anomalies as they occur, in particular, with ASCII-coded text information such that decryption of the data without knowledge of the key becomes even more complicated.

The data to be stored may be encrypted and/or compressed prior to division into source blocks by utilizing a file key selected by a user. The data redundancy of the source blocks is additionally reduced due to utilization of another user-selected encryption and/or compression.

A block length between a predefined minimum block length and a predefined maximum block length is defined for each source block based on a random function, wherein the stored control data comprises additional information on the defined block length. Random selection of a variable block length additionally complicates decryption of the encrypted data without knowledge of the corresponding control data.

The control data stored at the first storage location may comprise additional information for validating the data stored at the second storage location or vice versa. The provision and evaluation of validation data makes it possible to detect and, if applicable, correct manipulations of data stored at a storage location.

A permutation is defined for a sequence of source blocks, wherein the encrypted data and the control data of a source block may be respectively stored at the first and the second storage location in a sequence that corresponds to the defined permutation and the stored control data comprises additional information on the original position of the source block and/or the defined permutation. Recovery of the encrypted data without knowledge of the control data can be additionally complicated by mixing up the sequence of the source blocks with respect to the stored data.

The method for recovering data that may comprise a plurality of source blocks, wherein the following steps are carried out for each source block:
  selecting at least one first storage location and one second storage location from a plurality of different storage locations at which data to be read is stored;
  reading control data that comprises information on a block key at the first selected storage location;
  reading encrypted data that comprises information on the encrypted data block at the second selected storage location; and
  decrypting the encrypted data block to recover the source block by utilizing the read block key.

Due to the above-described procedural steps, encrypted data that was stored can be read in and recovered by an authorized user.

The above-described methods are particularly suitable for use in a storage cloud that comprises a plurality of different storage locations, wherein the storage locations are spatially, organizationally and/or technically separated from one another. Utilization of a storage cloud in connection with the described methods combines the advantages of the low operating costs of a virtualized infrastructure with a high data security.

A storage server for storing large amounts of data may comprise at least one client interface for storing and reading data by at least one application, at least one network interface for accessing a plurality of different available storage locations and at least one processor for executing stored program code. In this case, the method may be carried out when the stored program code is executed. Such a storage server is particularly suitable for providing central storage services in a computer center.

I also provide a computer program product for carrying out my methods.

Different examples are described in greater detail below with reference to the attached drawings.

FIG. 1 shows a first arrangement 100. The arrangement 100 comprises a local storage server 110 as well as a local mass storage 120. The local mass storage 120 serves, for example, for holding available and/or for intermediately storing current files of a company computer center.

The storage server 110 makes it possible to back up the data of the local mass storage 120 in a storage cloud 130 and retrieve the data from the storage cloud 130. For example, the storage server 110 may carry out an archival storage or a backup of the data stored on the local mass storage 120 in the storage cloud 130.

The storage cloud 130 comprises three storage locations 140a, 140b and 140c. The storage locations 140 consist of spatially, organizationally or technically different storage locations. For example, they may be different providers of hard disk storage space that are connected to the Internet. The storage locations 140 are spatially separated if they are not arranged in one and the same computer center. They are organizationally separated if they are not under the economical, legal or actual control of one and the same operator. They are technically different if the individual storage locations 140 are arranged in different subnetworks and use different operating systems or backup procedures or other technical characteristics for the access control.

The data of the local mass storage 120 is divided into three source blocks 122a, 122b and 122c. Each of the source blocks 122 in turn consists of a first part 124 and a second part 126. In this case, the division into a first and a second part may be a nearly arbitrary division of the data of the source blocks 122 that may also vary between one source block 122a and a following source block 122b. It is also possible, in particular, to divide individual bits of a byte of the data of the source blocks 122 in accordance with an allocation rule as described further below.

The source blocks 122 may consist, for example, of the blocks of a local file system. However, the data may also be divided into source blocks 122 in any other way. The length of the individual source blocks 122, in particular, may also be selected differently to complicate an unauthorized recovery of the data. The methods described below generally are the more secure, the smaller the size of the individual source blocks 122 is chosen. Consequently, the source blocks 122 preferably are significantly smaller than the total amount of data to be backed up. The source blocks 122 preferably are smaller than 100 kB and larger than 512 bytes. The source blocks may have a size of approximately 4 KB.

FIG. 1 clearly shows the way in which the data of the local mass storage 120 can be mapped on the storage locations 140. According to the first example, the data of the source blocks 122 is respectively divided into its first and second parts, wherein an encrypted first part 124 is stored at a different storage location 140 than an encrypted second part 126. In addition, control data for recovering the source blocks 122 is stored at the remaining third storage location 140. The control data at the third storage location 140 comprises, among other things, a key used for encrypting the first and/or the second part 124 and 126 and, if applicable, other data such as, for example, information on the division of the source blocks 122 into the first part 124 and the second part 126.

The data belonging to the first source block 122a is distributed over the three storage locations 140a to 140c. A first control block 142a that comprises a key for decrypting encrypted data is stored, in particular, at the first storage location 140a. A first encrypted data block 144a and a second encrypted data block 146a with the encrypted data of the first part 124a and the second part 126a of the first source block 122a are respectively stored at the second and the third storage location 140b and 140c. Consequently, neither storage location 140a, 140b or 140c can reconstruct the data of the first source block 122a by itself. Although the first storage location 140a has information on the key required for the decryption, it neither has information on the first encrypted data block 144a nor information on the second encrypted data block 146a. Although the second and the third storage location 140b and 140c respectively have information on part of the encrypted data and could, in principle, attempt to decrypt this data, they neither have information on the key used for the encryption nor a sufficiently large amount of data available for successfully carrying out an attack based on statistical evaluation.

The storage locations 140a to 140c used are respectively mixed up in a cyclic fashion for the data of the other source blocks 122 so that no individual storage location 140 has information on all keys used for the encryption.

The arrangement illustrated in FIG. 1 merely has an exemplary character. The number of storage locations 140 used, in particular, can basically be increased in a nearly arbitrary fashion. The larger the number of different storage locations 140 involved in the storage of the encrypted data, the more complicated it is for a potential attacker to obtain information on sufficient data for carrying out a successful decryption. If a large number of different storage locations 140 are involved, it would also be possible to carry out a random distribution of the data over the storage locations 140 instead of the deterministic division illustrated in FIG. 1 in which the storage locations 140 used for the control blocks and data blocks 142, 144 and 146 are mixed up in a cyclic fashion to additionally complicate a systematic analysis. The structuring of the storage locations 140 into blocks 142, 144 and 146 in accordance with FIG. 1 is of purely logistic nature and therefore unrecognizable at the respective storage location 140.

Figure 2:
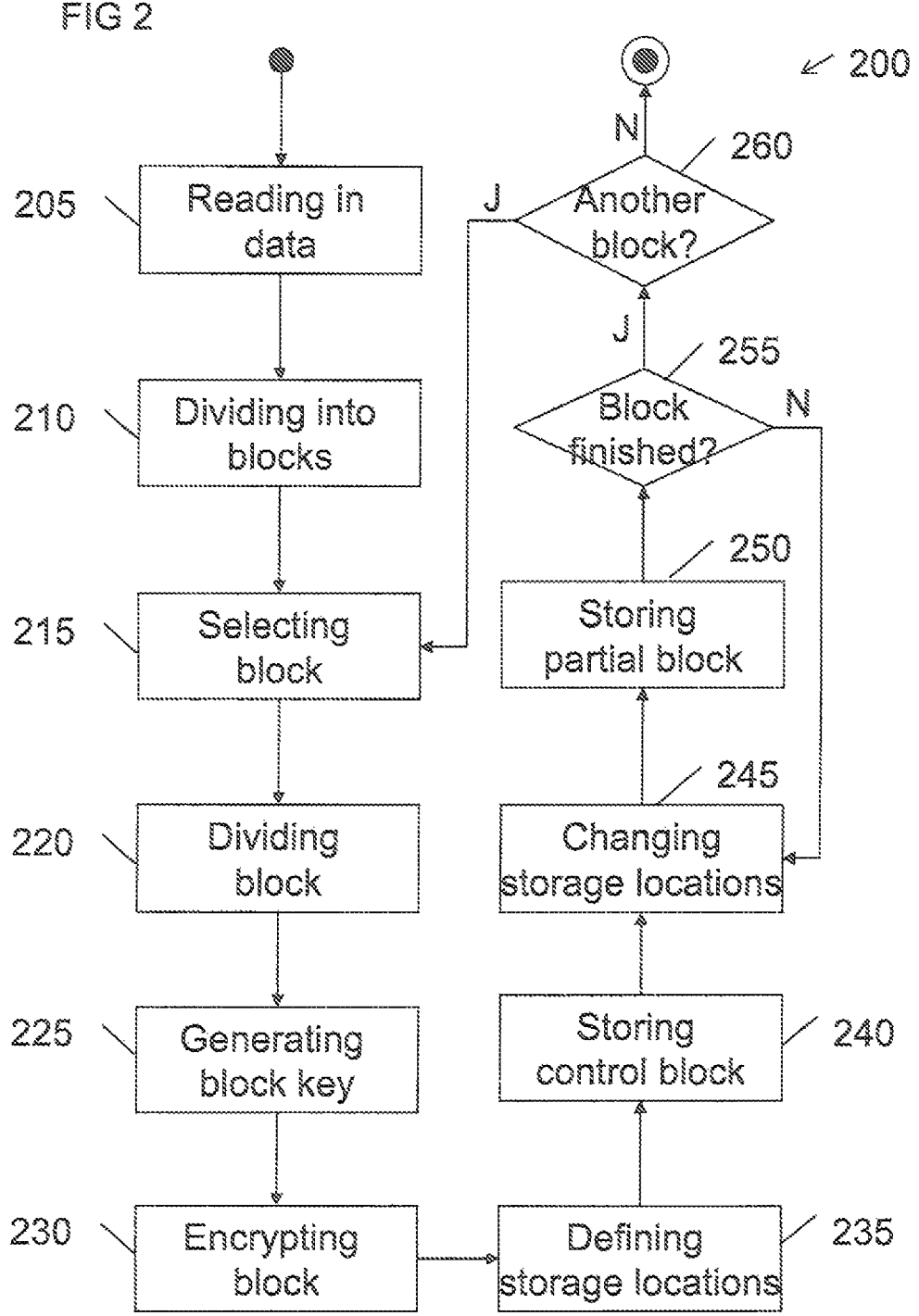
FIG. 2 shows a flow chart of a method for storing data according to a first example.

FIG. 2 shows a flow chart of an exemplary method 200 for storing data in the arrangement 100 according to FIG. 1.

In step 205, data to be stored in the storage cloud 130 is read in. For example, an individual file to be backed up may be read in by the local mass storage 120. The data to be stored consists of an extensive data compilation, particularly data to the extent of quite a few gigabytes, terabytes, petabytes or more. Such amounts of data are accumulated, for example, in the preparation of complete backups of servers of a local computer center or other archiving applications.

In step 210, the read-in data is divided into a plurality of source blocks 122. The source blocks 122 may consist, for example, of a relatively fine division of a basic storage architecture such as, for example, the storage block of a hard disk drive. However, it would naturally also be possible to realize other divisions that are based on specified or randomly selected parameters for the block length.

In step 215, a source block 122 is selected from the total number of source blocks 122 based on a random function or a specified permutation. The procedural steps described below exclusively refer to the block selected in step 215.

In step 220, a source block 122 is divided in accordance with an allocation rule for dividing the source block 122. For example, a source block 122 may be simply divided into a first part 124 and a second part 126 as illustrated in FIG. 1.

However, the division may be carried out such that possibly existing redundancies in the source blocks 122 are resolved. For example, it is a known fact that data encoded in the form of text information has a statistically uneven distribution of the bits used for the encoding. To resolve this statistical imbalance, for example, the first, third and eighth bit of the first byte may be allocated to the first part 124 and the remaining bits, i.e., the second, fourth, fifth, sixth and seventh bit, are allocated to the second part 126. With respect to the second byte of the source block 122, for example, the third, fourth and seventh bit are allocated to the first part 124 and the remaining bits are allocated to the second part 126. With respect to the third byte, only the bits seven and five are allocated to the first part 124 and the remaining bits are allocated to the second part 126. With respect to the fourth byte, the bits eight, one and two are allocated to the first part 124 and the remaining bits are allocated to the second part 125. The above-described sequence is repeated for the fifth byte and the following bytes of the source block 122, i.e., the bits one, three and eight are once again allocated to the first part 124 and the remaining bits are allocated the second part 126 for the fifth byte.

A clearly defined logic with respect to the division of the bits over the first part 124 and the second part 126 therefore exists within a source block 122. However, this division changes in accordance with a random function for each source block 122 being processed. This results in a bit stream, in which the redundancies of byte-oriented data are resolved.

In step 225, a key for encrypting the data of the selected source block 122 is generated. The key is preferably generated by utilizing a random function or a pseudo-random function.

In a following step 230, the parts 124 and 126 of the divided blocks are encrypted with the generated key. Any known encryption method basically may be considered for this purpose. Suitable encryption methods include, for example, the block encryption methods according to the Advanced Encryption Standard (AES), the Data Encryption Standard (DES) or the open PGP Standard according to RFC 4880.

To maintain the computing effort low during the encryption of the individual parts of the source blocks 122, an alternative approach may utilize an exclusive OR function (XOR) as encryption function. This may be realized, among other things, if the keys are relatively long or the source blocks 122 are relatively short. The utilization of an exclusivity OR results in a symmetric, random encoding of the bits of the source block 122 based on the bits of the randomly generated block key.

In another step 235, different storage locations 140 for storing the encrypted data and corresponding control data are defined. In the example illustrated in FIG. 1, the number of storage locations is specified in advance as amounting to three storage locations 140. All three storage locations 140a to 140c are selected for the storage of data and successively chosen in a predefined sequence.

In another step 240, a control block 142 is stored at a first storage location 140a. The control block 142 contains information on the allocation function used in step 220, as well as on the key generated in step 225. The control block 240 may optionally also contain other information such as, for example, the position of the source block 122 within a read-in file or similar details.

In step 245, the currently used storage location 140 is changed. For example, if the control block was stored at the first storage location 140a in step 240, the next storage location 140b is now selected. Instead of a consecutive selection of the storage locations 140, it would naturally also be possible to randomly select another storage location 140 that has not been used for the source block 122 yet.

In step 250, the first part 124 of the encrypted data block 144 is stored at the current storage location 140b. The stored data preferably does not contain any reference to the source block 122 or file, to which it belongs, the location, at which the corresponding control block 142 is stored, or any data that is required for decrypting the encrypted data block 144. In another instance, however, the encrypted data block 144 may comprise validation data such as a checksum for detecting changes of the control block 142.

In a subsequent step 255, it is checked whether all parts of the storage block 122 currently being processed have already been stored. If this is not the case, the method is continued with step 245 so that the last remaining storage space 140c is now selected in the described example. In step 250 that subsequently is carried out once again, the second encrypted data block 146 is stored at the third storage location 140c. If it is detected that all parts of the encrypted source block 122 have been stored in the storage cloud 130 in step 255, the method is continued with step 260.

In step 260, it is checked whether other source blocks 122 of the data to be backed up still need to be processed. The method 200 is terminated if this is not the case. If other source blocks 122 still need to be processed, the method 200 is once again continued with the random selection of a source block 122 for further processing in step 215 until all source blocks 122 have been processed.

Figure 3:
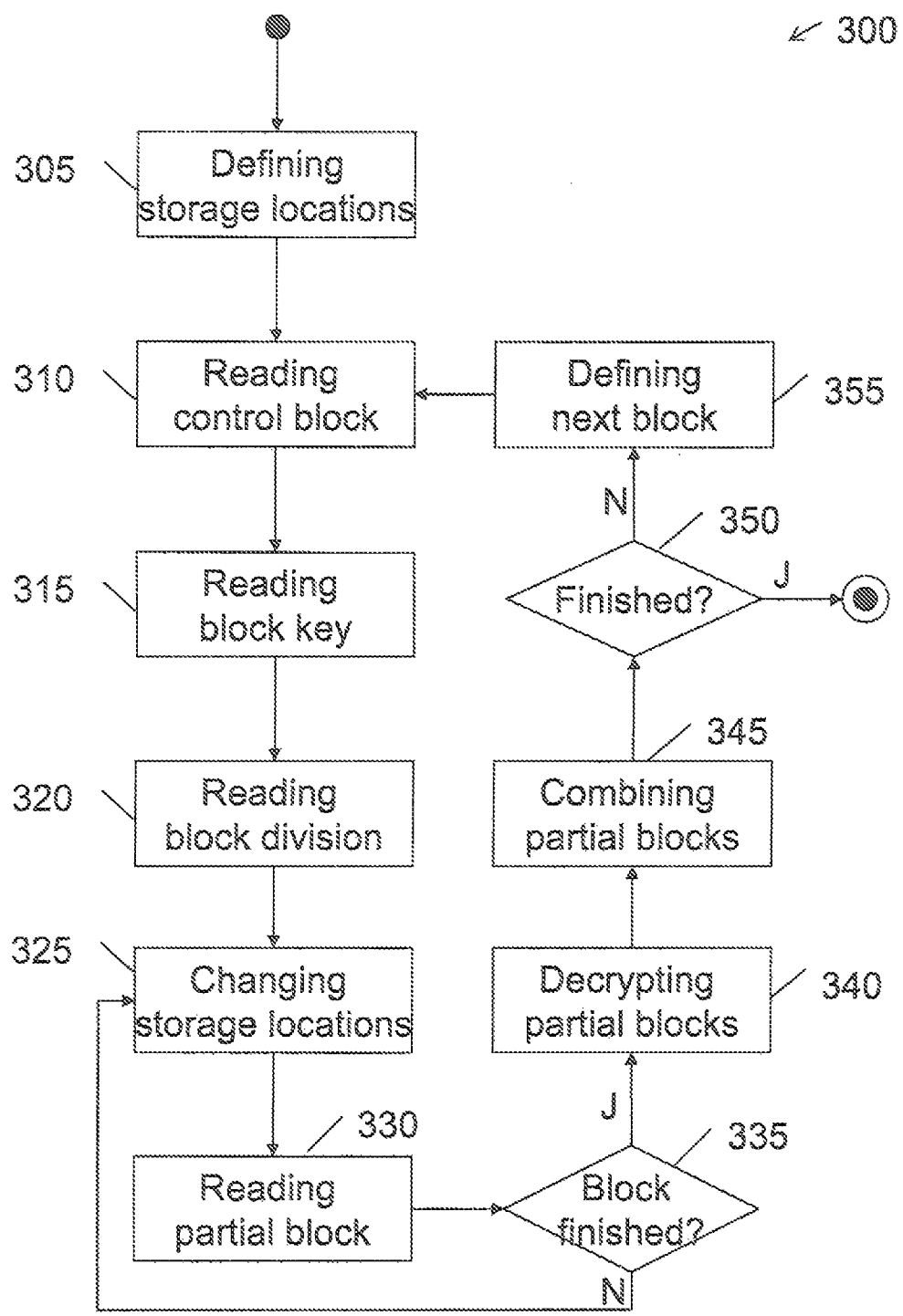
FIG. 3 shows a flow chart of a method for reading in data according to the first example.

FIG. 3 shows a flow chart of a method 300 for reading in data that was stored with the method 200 according to FIG. 2.

In a first step 305, the three storage locations 140a, 140b and 140c to be used are defined. This may be realized, for example, based on data that is locally stored in the storage server 110 or based on data contained in a first control block 142a, wherein an address of the first storage location 140a may be locally stored in this case. The definition of the storage locations naturally may also be carried out manually by a user.

In step 310, the first control block 142a is initially read in from the first storage location 140a.

In step 315, a key for decrypting the corresponding encrypted data blocks 144a and 146a is read in the control data contained in the control block 142a.

In step 320, the block division is also determined based on the data of the control block 142a. The data of the control block 142a may indicate, for example, which bits of the first source block 122a were stored in which encrypted data block 144a or 146a.

In another step 325, a change from the first storage location 140a to the next storage location 140b takes place. In step 330, the first encrypted data block 144a is subsequently read in.

In a subsequent step 335, it is checked whether all parts of the encrypted source block 122a have already been read in. If this is not the case, the method is continued with once again changing the storage location to the third storage location 140c and subsequently reading in the next encrypted data block 146a in step 325. If it is determined in step 335 that all parts of the encrypted source block 122a have been read in, the method is continued with step 340.

In step 340, the read-in encrypted partial data blocks 144a and 146a are decrypted by utilizing the read-in block key and then once again combined with one another in accordance with the allocation rule of the control data in step 345.

In a subsequent step 355, it is checked whether all source blocks 122 of the data to be recovered have been processed. If this is not the case, the next source block 122b to be processed is defined, for example, based on the control data of the first control block 142a and the method is continued with step 310. However, the method 300 is terminated if it is detected that all blocks 122 have been read back from the storage cloud 130 in step 350.

Figure 4:
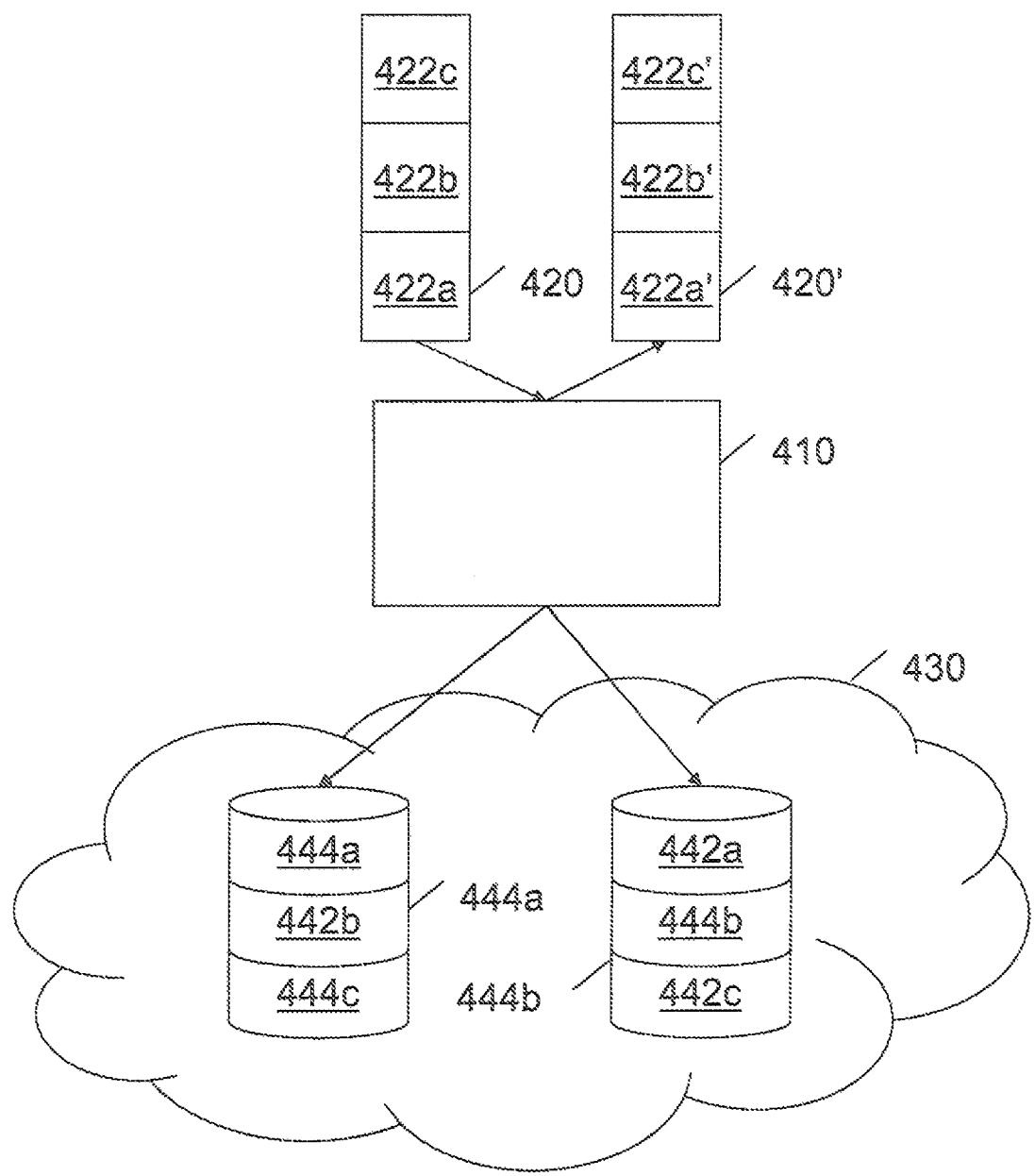
FIG. 4 shows a second arrangement for processing data.

FIG. 4 shows a second arrangement 400 for storing and once again reading in data.

The second arrangement 400 can be distinguished from the first arrangement 100 according to FIG. 1, among other things, in that the data 120 to be stored is present in the form of a data stream 120 that can only be accessed in sequential order by a storage server 410. A sequential data stream 420' is also generated during the recovery of the stored data.

As described above with reference to FIGS. 1 to 3, such a sequential data stream 420 or 420' can, in principle, be divided into finite parts and processed by providing a correspondingly large buffer for the storage server 410. However, another variation of a method 500 for storing the data stream 420 without providing a buffer for the intermediate storage is described below.

The arrangement 400 according to FIG. 4 furthermore can be distinguished from the first arrangement 100 in that the storage cloud 430 only comprises two different storage locations 440a and 440b. For example, the first storage location 440a consists of a local storage location of the own computer center and the second storage location 440b consists of an external storage location that is arranged, for example, in the Internet. The first storage location 440a and the second storage location 440b jointly form a so-called "hybrid" storage cloud.

The data stream 420 contains a number of source blocks 422a to 422b that can only be accessed by the storage server 410 sequentially, i.e., in succession. The individual source blocks 422a to 422c respectively are alternately stored at the first storage location 440a and at the second storage location 440b in the form of encrypted data blocks 444a to 444c as illustrated in the lower portion of FIG. 4. A corresponding control block 442a to 442c is stored at the other respective storage location 440b or 440a. In this way, neither of the storage locations 440a or 440b once again has all the information required for decrypting the data block 422' of the data stream 420'.

Figure 5:
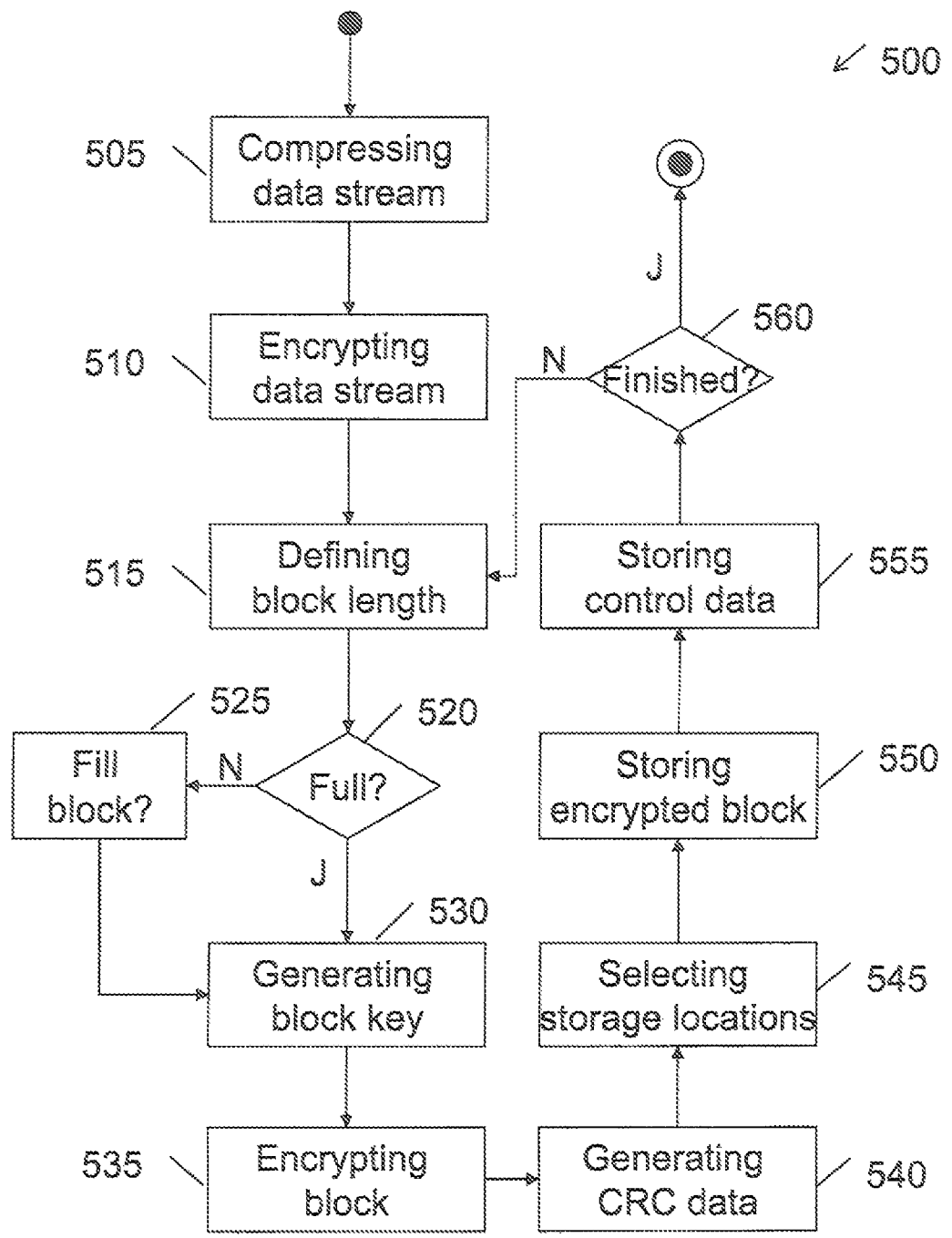
FIG. 5 shows a flow chart of a method for storing data according to a second example.

FIG. 5 shows a method 500 for storing data that is suitable for use in the arrangement 400 according to FIG. 4.

In a first step 505, the data stream 420 is compressed. Due to the compression of the data stream 420, a redundancy of the data contained in the data stream 420 is reduced and the bit alignment of byte-oriented data such as, for example, text files is resolved.

In a subsequent step 510, the data stream 420 is encrypted with a user-specific key. For example, a relatively elaborate and secure encryption method may be used for this purpose. Examples of known encryption methods are the so-called Data Encryption Standard (DES), the Advanced Encryption Standard (AES) or asymmetric encryption methods such as, for example, the so-called Diffie-Hellmann algorithm or the RSA algorithm. Encryption of the data stream 420 serves to reduce redundancy of the data stream 420, as well as for implementing additional security for a user against technical components of the arrangement 400 such as, in particular, the storage server 410.

In another step 515, a block length for a source block 422a to be processed is defined. A block length within a predefined minimum block length and a predefined maximum block length is defined for this purpose by a random generator. For example, a block length can be randomly chosen in the range between 512 byte and 4096 byte.

In a subsequent step 520, it is checked whether the defined block length can be completely filled with the remaining data of the data stream 420 or the end of the data stream 420 has been reached. If the end of the data stream 420 has been reached, the remaining block length of the source block 422a is filled with randomly selected padding characters in step 525.

In a subsequent step 530, a random key for encrypting the data of the source block 422a is generated. The source block 422a is encrypted with the previously generated block key in another step 535.

In a subsequent step 540, validation data for checking the integrity of the source block 422a is defined. For example, a so-called cyclic redundancy check digit (CRC) can be calculated and used for detecting a manipulation of parts of the encrypted source block 422a.

To improve efficiency, only a single cyclic redundancy check digit is defined for the entire encrypted file as an alternative. This check digit is continuously updated and only stored once, for example, with the control data of the first or last source block 422 being processed.

In step 545, the storage locations 440a and 440b to be used for the storage of the encrypted data are selected. In another step 550, an encrypted data block 444a is then stored at the first storage location 440a. Corresponding control data 442a is stored at the other storage location 440b in step 555.

The stored control block 442a contains the block length chosen in step 515, a reference, if applicable, as to if or how many bytes of the source block 422 were filled with padding characters in step 525, the block key used for the encryption and the validation data. The described listing of control data merely has an exemplary character. It is also possible, in particular, to entirely or partially store other control data such as, for example, the control data described with reference to FIGS. 1 to 3 in the control block 422a.

Parts of the encrypted data may also be stored in the control block 422a. For example, individual bits of the bytes of the source block 422a may be selected as described above and stored in the control block 422a together with the control data. In this case, only a relatively small part of the encrypted data should be stored in the control block 422a to preclude a possible decryption with the key that is also stored therein.

In step 560, it is checked whether the end of the data stream 420 has been reached. If this is the case, the method 500 is terminated. Otherwise, the method 500 is continued with defining a new block length for the following source block 422b in step 515, wherein the storage locations 440a and 440b are interchanged when step 545 is subsequently carried out.

FIG. 6 shows a flow chart of a method 600 for reading the data stored with the method 500.

In a first step 605, the storage locations 440a and 440b to be used are selected. In step 610, the first control block 442a with the first control data is read in. The chosen block length of the first encrypted data block 444a is determined in step 615 based on the read-in control data.

In step 620, the first encrypted data block 444a is read in from the other respective storage location 440b. In step 625, validation data contained in the control block is used for checking the integrity of the encrypted data block 444a.

In step 630, the key required for the decryption is read in from the control block 442a. In a subsequent step 635, the encrypted data block 444a is decrypted with the aid of the read-in block key.

In step 640, it is checked whether other encrypted data blocks are present. This type of information may also be contained, for example, in the control block 442a. If this is the case, the method is continued with step 605, wherein the storage locations 440a and 440b are interchanged as described above with reference to FIG. 5.

If it is determined that the end of the data stream 420' has been reached in step 640, possibly existing padding data is removed from the decrypted data blocks 422' in step 645.

In a subsequent step 650, the user-dependent encryption is reversed by decrypting the data stream. In a last step 650, the data is decompressed so that a copy of the original data stream 420' is available. The described decryption and decompression naturally may also be carried out on-the-fly, i.e., continuously, thus it is not necessary to wait for following data blocks 422b' and 422c'.

The described methods are particularly suitable for use in archiving and backup processes in which very extensive data is stored for long periods of time. In such processes, the stored data is only rarely accessed so that longer access times as they are caused by the use of remote storage locations, are not as important as in other applications. On the other hand, such applications are very storage-intensive such that economically significant cost savings are realized due to the utilization of storage clouds.

The described methods clearly resemble "shredding" of the data to be stored. In this case, one individual data segment, i.e., a "shred" that is stored at an individual storage location, does not suffice for recovering the entire information.

This type of storage makes it possible, in principle, to store security-critical data on unreliable servers. To ensure the availability of the data, the individual data blocks may be redundantly stored at different storage locations. In this case, the data can also be recovered in case of a malfunction of an individual storage location or the manipulation of the data stored at this storage location. During the replication of the stored data blocks, however, it needs to be ensured that all information required for recovering the data is not stored at any storage location.

The data is preferably not only divided over the different storage locations along a first dimension, particularly the length of the source blocks, but also in a second dimension such as, for example, the individual bits of each byte. This can be realized, for example, in that the data is initially read into an intermediate storage of a storage server and read out of this intermediate storage in a matrix-like fashion. In this case, it is irrelevant whether an entire file to be stored or only a finite segment of a very extensive data set is read into the intermediate storage.

The security of the described methods can be additionally increased, for example, by also using different encryption algorithms for encrypting individual source blocks in addition to different keys and block lengths. An unauthorized decryption of the stored data furthermore can be complicated by embedding random dummy information in the stored data.

Due to the distribution of the data over several storage locations and the required collaboration of all storage locations for recovering the data, the security against possible data theft is exponentially increased. If it is assumed that the data of an individual storage location becomes publicly accessible with a probability P, the risk of public access to the complete data of all storage locations used is reduced to the probability $P^n$, wherein n represents the number of storage instances used. When using three storage locations in connection with a data theft risk of 1% within 10 years, the probability therefore is already reduced to 0.001%.

Although the individual steps of the respective reading and recovery methods were described in a certain sequence and combination in the two examples, they may be advantageously combined in various ways and sequences. Individual security measures of the two examples may, in particular, be combined with one another or omitted to achieve a desired compromise between data security, performance and redundancy.

The invention claimed is:

1. A method of storing data by a storage server in which the data to be stored is divided into a plurality of source blocks, each source block subjected to steps comprising:
   defining a block key individual for the source block based on a random function;
   encrypting the source block by utilizing the defined block key;
   selecting at least one first storage location and one second storage location from a plurality of different available storage locations external to the storage server;
   storing control data that comprises information on the defined block key at the first selected storage location; and
   storing encrypted data that comprises information on the encrypted source block at the second selected storage location;
   dividing the data of the source block into a number N, N>1, of data blocks;
   defining an allocation rule for dividing predefined information units of the source block, wherein the data of the source block is divided over the N data blocks in accordance with an allocation rule in the division step, and the stored control data comprises additional information on the defined allocation rule;
   storing the N data blocks at N storage locations of a plurality of storage locations, wherein data of each of the N data blocks is stored at a different storage location of selected N storage locations.

2. The method according to claim 1, wherein the at least one first storage location is selected from a plurality of storage locations by a random function and the at least one second storage location is selected from the plurality of storage locations minus the selected storage location in the selection step.

3. The method according to claim 1, wherein the at least one first storage location for a following source block is selected from a plurality of storage locations minus the first storage location selected for a preceding source block by a random function in the selection step.

4. The method according to claim 1, wherein redundancy of data of the source block is reduced prior to storage of the encrypted data.

5. The method according to claim 1, wherein the predefined information units comprise bytes with 8 bits per byte and the data of the source block is divided over the N data blocks in accordance with the allocation rule such that neither of the N data blocks contains all bits of a byte of the source block.

6. The method according to claim 4, wherein the data to be stored is encrypted by utilizing a key selected by a user prior to the division into the source blocks.

7. The method according to claim 4, wherein the data to be stored is compressed prior to division into source blocks.

8. A method of storing data in which the data to be stored is divided into a plurality of source blocks, each source block subjected to steps comprising:

defining a block key for the source block based on a first random function;

defining a block length for the source block between a predefined minimum block length and a predefined maximum block length based on a second random function;

encrypting the source block with the defined block key;

selecting at least one first storage location and one second storage location from a plurality of different available storage locations;

storing control data comprising information on the defined block key at the first selected storage location, wherein the stored control data further comprises additional information on the defined block length; and storing encrypted data comprising information on the encrypted source block at the second selected storage location.

9. The method according to claim 1, wherein the control data stored at the first storage location also comprises information for validating the data stored at the second storage location or vice versa.

10. The method according to claim 1, further comprising:

defining a permutation for a sequence of source blocks, wherein the encrypted data and the control data allocated to a source block are respectively stored at the first storage location and the second storage location in a sequence corresponding to the defined permutation, and wherein the stored control data comprises additional information on an original position of the source block and/or the defined permutation.

11. A storage server for processing large amounts of data, comprising:

at least one client interface for storing and recovering data by at least one application;

at least one network interface for accessing a plurality of different available storage locations; and at least one processor for executing stored program code, wherein a method according to claim 1 is carried out when the stored program code is executed.

12. A storage server that processes large amounts of data comprising:

at least one client interface for storing and recovering data by at least one application;

at least one network interface for accessing a plurality of different available storage locations; and at least one processor for executing stored program code, wherein a method according to claim 8 is carried out when the stored program code is executed.

13. A method of storing data by a storage server in which the data to be stored is divided into a plurality of source blocks, each source block subjected to steps comprising:

defining a block key individual for the source block based on a random function;

encrypting the source block by utilizing the defined block key;

selecting at least one first storage location and one second storage location from a plurality of different available storage locations external to the storage server;

storing control data that comprises information on the defined block key at the first selected storage location;

storing encrypted data that comprises information on the encrypted source block at the second selected storage location;

dividing the data of the source block into a number N, N>1 of data blocks; and storing the N data blocks at N storage locations of a plurality of storage locations, wherein data of each of the N data blocks is stored at a different storage location of selected N storage locations, and wherein the data of a first data block of the N data blocks is stored at the first selected storage location together with the control data and the data of at least one other data block of the N data blocks is stored at the second selected storage location.

14. A storage server that processes large amounts of data comprising:

at least one client interface to store and recover data by at least one application;

at least one network interface to access a plurality of different available storage locations; and at least one processor to execute stored program code, wherein a method according to claim 13 is carried out when the stored program code is executed.

* * * * *